L. BRANDEIS.
Solder.
No. 85,057.
Patented Dec. 22, 1868.
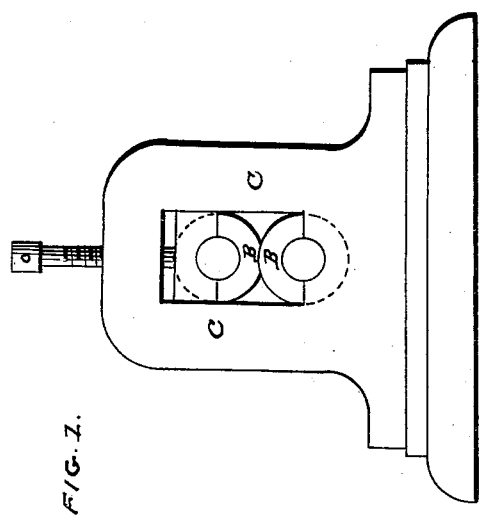
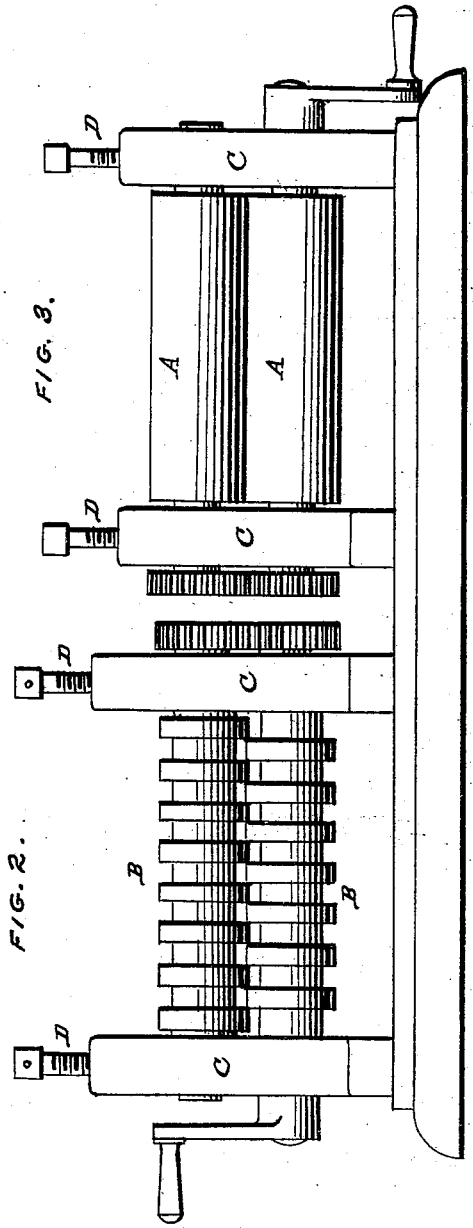
WITNESSES:
George Inch
William Haines Jr
INVENTOR.
L. Brandeis

LEOPOLD BRANDEIS, OF BROOKLYN, NEW YORK.

Letters Patent No. 85,057, dated December 22, 1868.

IMPROVED SOLDER.

The Schedule referred to in these Letters Patent and making part of the same.

*To all whom it may concern:*

Be it known that I, LEOPOLD BRANDEIS, of the city of Brooklyn, county of Kings, and State of New York, have invented a new and improved Mode of Manufacturing Solder in pieces of desirable shape and weight, for the purpose of economizing and simplifying its use, and to secure a complete control over the workmen.

The nature of my invention consists in casting the alloy, usually called solder, into warm moulds, in the shape of suitable ingots or plates, of stretching or rolling these ingots by means of cast-iron rollers, chilled or steel rollers, either warmed or cold, to the proper dimensions, and cut into desirable pieces by means of punches or circular shears.

The drawing explains the process,

No. 1 being the cutting-rollers or revolving (circular) shears.

No. 2, the laminating-rollers.

I do not claim to produce a new article, nor do I claim the invention of new machinery; but I confine my claim exclusively to the production, by a new combination and arrangement of machinery, to aforesaid purpose.

What I claim as my invention, and desire to secure by Letters Patent, is—

The production of laminated solder, cut into pieces of desirable shape and weight by means of rollers and revolving shears, for the purposes of producing pieces of regular weight, so as to insure a perfect control over the workmen.

LEOPOLD BRANDEIS.

Witnesses:
CHARLES J. JOHNSON,
M. FOSTER.